Mar. 27, 1923.
1,449,517
H. F. LAME
HEATING IRON FOR MELTING PLASTIC SUBSTANCES
Filed Mar. 28, 1922
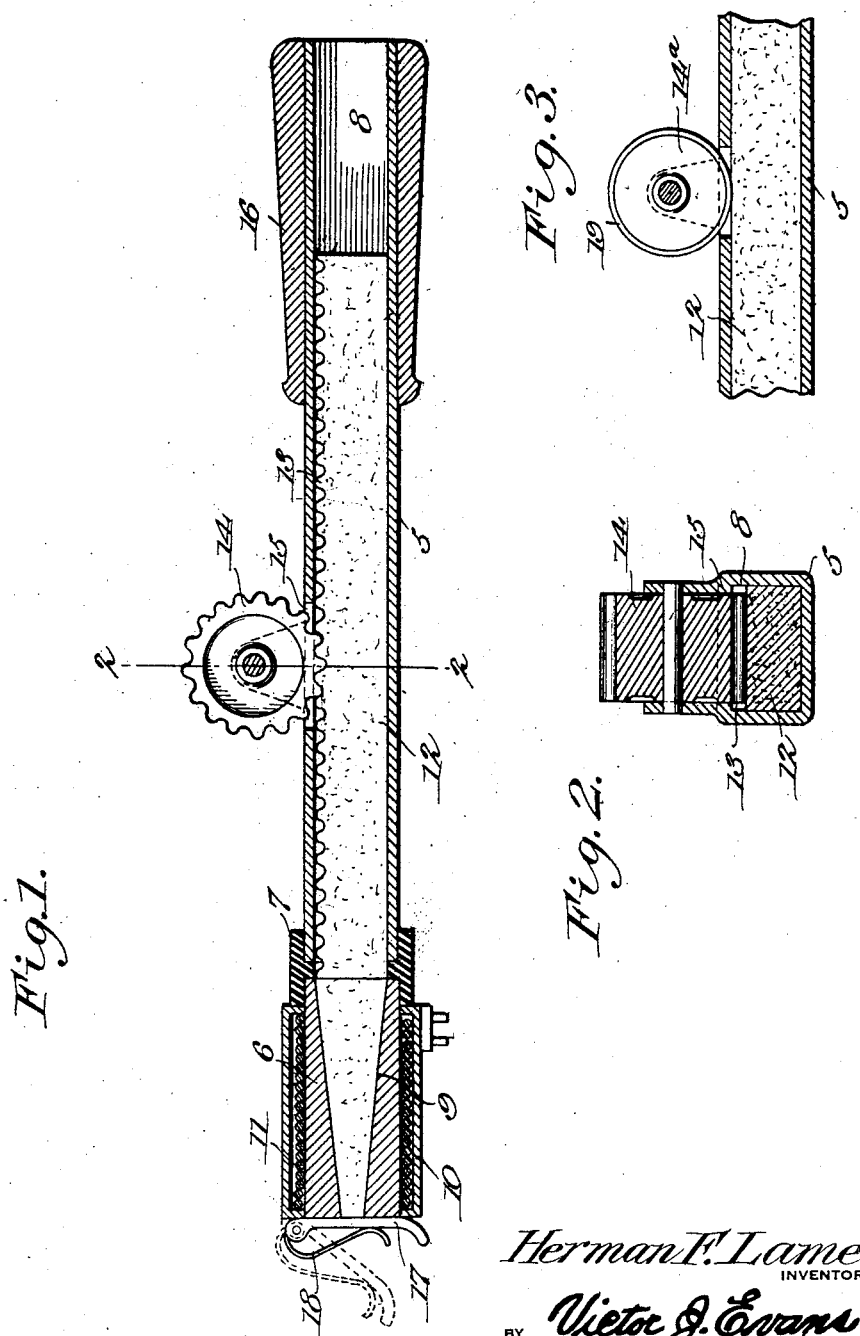
Herman F. Lame,
INVENTOR
BY Victor J. Evans
ATTORNEY
WITNESS Fred W. Ely, Patented Mar. 27, 1923.

1,449,517

UNITED STATES PATENT OFFICE.

HERMAN F. LAME, OF JERSEY CITY, NEW JERSEY.

HEATING IRON FOR MELTING PLASTIC SUBSTANCES.

Application filed March 28, 1922. Serial No. 547,510.

*To all whom it may concern:*

Be it known that I, HERMAN F. LAME, a citizen of the United States, residing at Jersey City, in the county of Hudson and State of New Jersey, have invented new and useful Improvements in Heating Irons for Melting Plastic Substances, of which the following is a specification.

This invention relates to heating irons and more particularly to irons for melting plastic or fusible substances, such as stick sealing wax, glue, etc.

An object of the invention is to provide a device of this character including a casing adapted to contain a stick of plastic or fusible composition which can be readily reduced to a hot flowing mass and conveniently and quickly applied to the object to be treated.

A further important object of the invention is to provide a device of this character with means adapted to co-act with a plastic or fusible stick, so that the latter will be quickly, and with respect to its length, successively subjected to the action of heat and then pressed forward and discharged from the device while in a molten state.

A still further object of the invention is to provide a device of this character with means for reducing a plastic or fusible substance to a molten mass and for causing a uniform discharge of same from the device and for pressing it in flat or sealing contact with the surface or object to be treated.

Other subsidiary objects of the invention will appear from the detail description of the invention, which consists in the novel construction, combination and arrangement of parts, hereinafter described, illustrated in the accompanying drawing and incorporated in the appended claims.

In the drawing:—

Figure 1, is a vertical longitudinal sectional view through the device.

Figure 2, is a section on the line 2—2 of Figure 1, and

Figure 3, is a view showing a slightly modified form of feeding means.

In carrying the invention into practice, I employ a casing 5, of conventional design, the same being hollow and open at its ends. This casing is joined with an oven or heating section 6, and in order that this can be properly done, and the oven supplied with heat from an electrical contrivance, I employ a coupling 7, between said parts 5 and 6. This coupling is formed of suitable well known insulating material. The casing 5 is provided with a bore 8, which maintains permanent registration with the bore 9 of the aforesaid oven section 6 by means of the coupling 7.

Surrounding the walls of the section 6 is a shell 10, and interposed between the latter and said walls is a heating coil 11, the same adapted to be arranged in an electric circuit, thereby supplying current to the coil which will cause it, when heated, to radiate its heat into the bore 9.

The bores 8 and 9 mutually constitute a chamber or receptacle of a design conforming with the stick 12. This stick for illustration is sealing wax, but same may be formed of any fusible composition of matter according to the use to which the device is put. This stick is preferably coextensive with the aforesaid chamber or receptacle, and along one of its sides, it is formed with teeth or means 13 adapted to co-act with a feeding mechanism or wheel mounted to revolve from the casing 5 and projecting through a passage 15 in the walls of said casing. The periphery of this wheel is suitably toothed to cause the bar or stick 12 to be advanced toward the front or discharge end of the device or through said oven section 6.

It will be observed that when heat is supplied to said oven section of the device, and assuming that a stick of fusible material has been operatively applied, as hereinbefore mentioned, the forward part of said stick will assume a molten state and is then free to flow from the front open end of said oven. In order to keep the oven section constantly supplied with material or a section of the stick, I construct the latter as herein referred to and I employ in connection therewith, the form of feeding mechanism shown at 14. This mechanism 14 is located directly in front of a hand grip 16 on the casing 5 so that it can be conveniently actuated and the stick gradually fed to the oven section 6.

In order that the hot mass of wax may be properly smoothed or ironed out in flat contact with the surface on which it is laid, I employ a swinging iron or shoe, 17 the same mounted on the front end of the oven 6 so as to traverse the bore 9 where it is adapted to contact with the heated or fused mass of material as the latter leaves the oven. Bearing against the shoe is a suitable spring 18 which slightly forces the shoe in contact with the fused material, thereby ironing same out or flattening it evenly against the surface to which it is applied as the device is drawn towards the operator.

In the modified form of the invention, the mechanism or wheel 14ª is provided with a yieldable facing material 19, the same adapted to yieldingly bear against the stick 12 to insure against breakage of the teeth 13 thereof when said mechanism is actuated.

While I have herein fully shown and described and have pointed out in the appended claims certain novel features of construction, arrangement and operation which characterize my invention, it will be understood by those skilled in the art that various omissions, substitutions and changes in the forms, proportions, sizes, of the materials used, and of their operation, may be made without departing from the spirit of my invention.

What I claim as new is:—

1. A device of the class described comprising a hollow casing open at its ends, and means for feeding a stick of fusible material through said casing, said means comprising a revolving wheel mounted upon the casing exteriorly thereof and projecting into said casing for feeding engagement with a stick of plastic substance.

2. A device of the class described comprising a hollow casing open at its ends, said casing including a means for heating a portion thereof, and means for feeding a stick of fusible material through said casing, the heating means serving to reduce the stick to a molten mass as it is fed through said casing and a swinging iron located at one end of the device for flattening the heated mass as it leaves said device.

In testimony whereof I have affixed my signature.

HERMAN F. LAME.